Feb. 25, 1958 P. D. KNOESTER 2,824,583
LOOP OR EYE FORMING PLIERS
Filed May 25, 1955
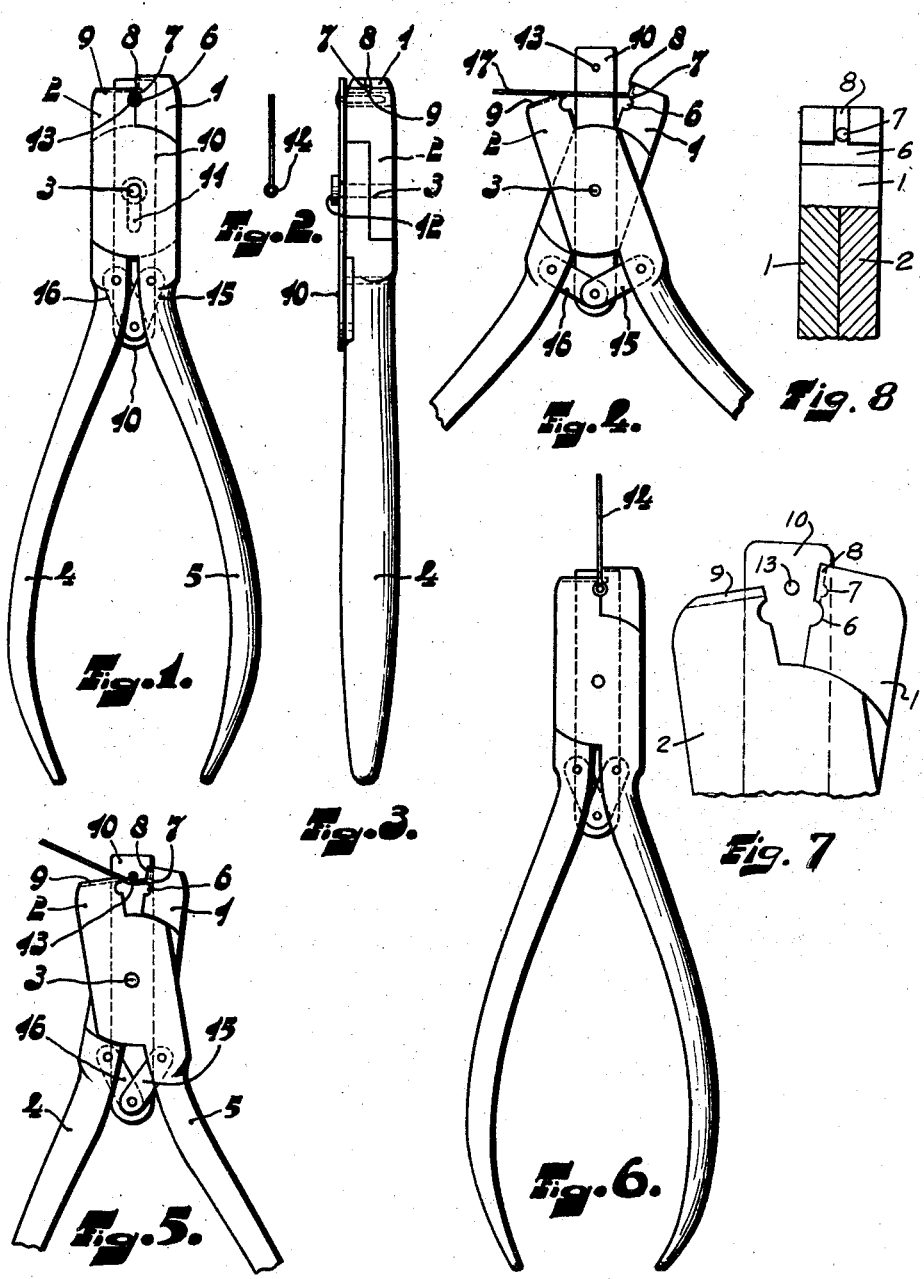
INVENTOR
PIETER DIRK KNOESTER
BY
AGENT

United States Patent Office 2,824,583
Patented Feb. 25, 1958

2,824,583
LOOP OR EYE FORMING PLIERS

Pieter Dirk Knoester, Hilversum, Netherlands, assignor, by mesne assignments, to North American Philips Company, Inc., New York, N. Y., a corporation of Delaware Application May 25, 1955, Serial No. 510,982

2 Claims. (Cl. 140—104)

This invention relates to tongs comprising two handles and intended for providing wire-like or band-like material with a loop which may be closed or not closed in itself, and it exhibits the characteristic that the tongs comprise a core pin having a periphery similar in shape to the inner side of the desired loop, provision being made of two jaws which are moved by the handles and which, when joined together, exhibit a cavity similar in shape to the outer periphery of the desired loop, the transmission between the movement of the two handles and the movement of the core pin being co-ordinated in such manner that, when the handles approach one another, the material which has already been deformed in part by the movement of the core pin is led between the two jaws as a result of the same movement and it is not until then that the jaws close.

The tongs according to the invention thus permit of obtaining a loop of any desired shape either at the end of the material or at a different area. The shape of the loop is dependent upon the shape of the core pin and upon the cavity in the jaws. The tongs are suited more particularly for providing small component parts of electrical apparatus such as resistors, capacitors and the like with so-called eyelets, but the tongs also permit of providing helical springs of, for example, clockworks, toys, etc. with eyelets.

In an embodiment of the invention, the two jaws are connected in an articulated manner, each jaw having an integral handle and both being pivotally connected to a plate with a slot in which a common pivot for both jaws moves. A pair of tongs according to this embodiment may constitute a small, handy tool which can easily be carried by fitters of, for example, electrical house installations.

In the embodiment of the invention, a pair of tongs designed for providing a loop at the end of the material which loop is substantially closed and positioned symmetrically to the longitudinal direction of the material, is characterized in that the jaws are of different length, the end surface of the shorter jaw exhibiting a guide groove for the material and the second jaw exhibiting a slot or aperture in opposition to the guide groove, it being possible for the end of the material to bear in the said slot or aperture prior to deformation. The second jaw exhibits a guide groove provided at right angles to the direction of supply of the material between the cavity in the jaw and the end surface of the jaw.

The loop that has been formed may readily be removed from the tongs, if the core has a shape in part such that the loop is readily detachable therefrom.

In order that the invention may be readily carried into effect, it will now be described, by way of example, with reference to the accompanying drawing showing one embodiment of a pair of tongs according thereto.

Fig. 1 is an elevation view of a pair of tongs suitable for providing circular eyelets at the end of a piece of wire (copper wire, iron wire, etc.) having a thickness of about 0.8 mm., the eyelet being positioned symmetrically with respect to the wire.

Fig. 2 shows a piece of wire having an eyelet manufactured with the use of the tongs of Fig. 1.

Fig. 3 is a side-view of the tongs of Fig. 1.

Fig. 4 shows the tongs of Fig. 1, completely open, with a piece of wire material led into the tongs, ready for manufacturing an eyelet.

Fig. 5 shows the tongs of Fig. 4, partly closed.

Fig. 6 shows the same tongs with material, completely closed, and with the eyelet formed.

Fig. 7 is an enlarged partial front elevational view of the tongs.

Fig. 8 is a sectional view of the tongs shown in Fig. 7 with the plate removed.

In the figures, reference numerals 1 and 2 indicate two jaws of a pair of tongs having a common pivot 3 and comprising handles 4 and 5. The jaw 1, which is longer than the jaw 2, exhibits a cavity 6 which in the case under consideration has a semi-circular shape. Provided closely above cavity 6 is an aperture 7 having a diameter equal to, or a little larger than that of the material to be worked. The jaw 1 also exhibits a groove 8 which extends from cavity 6 to the end surface and of which the half diameter, as before, is approximately equal to the half diameter of aperture 7. Provided in the upper end surface of jaw 2 is a guide groove 9 which is similar in shape to the groove 8 and which opens approximately opposite the aperture 7 when the tongs are closed. The tongs also comprise a plate 10 exhibiting a slot 11 which embraces the pivot pin 3 comprising a head 12. The upper end of plate 10 comprises a core pin 13 having a shape similar to the inner side of the eyelet 14 to be formed. The core pin is slightly conical on the side remote from the plate 10, so that the eyelet, after being formed, can readily be slipped off the core pin. The plate 10 is guided not only by pin 3 but also by two links 15 and 16 each rotatably secured to a handle and to the plate 10, so that the latter can perform a rectilinear movement only.

If a wire extremity such as that of a resistor, a capacitor, but also a wire for an electrical house installation and the like is to be provided with an eyelet, the extremity is introduced into the open tongs as shown in Fig. 4, in which the extremity is indicated by 17. The extremity bears in the guide groove 9 and is led into the aperture 7 while passing under the core pin 13, whereupon the tongs are closed. The core pin 13 pushes the wire downwards (see Fig. 5) while partially deforming it, so that the extremity disengages from the aperture 7. Upon further movement of the jaws the core pin 13 leads the deformed wire between the cavities 6 and when the jaws are closed, they form the wire extremity as a loop or eyelet around the core pin. When the tongs are opened, the eyelet can readily be removed from the core pin due to the slightly conical shape thereof.

As an alternative, the described tongs may be designed in such manner that an eyelet is made from striplike or bandlike material. For this purpose the guide grooves 8 and 9 must have the shape of the material to be worked, the aperture 7 having the shape of a slot. The core pin 13 may have a circular cross-section, but it may alternatively be rectangular, elliptical or of any other shape. The cavities 6 must have a corresponding shape, thus enabling to form loops of any desired shape.

It is alternatively possible for loops to be provided at any arbitrary area instead of at the end of the material. The aperture 7 may in this case be dispensed with. The two jaws in this case must have the same height and preferably exhibit guide grooves at their upper surfaces.

What is claimed is:

1. Pliers for forming a complete loop in the end of a wire or strip-like material, said pliers comprising a pair of handles each having a jaw at one end thereof, a pivot pin connecting said jaws together, a pair of linking members being pivotally connected together at one end and to the adjacent respective handles at the other end, a movable plate secured at one end to said pivotal connection of said linking members and provided at the other end with a core-forming projection corresponding to the inside diameter of the loop to be formed and tapering toward its free end, said jaws having a configuration when moved together corresponding to the outer diameter of said loop to be formed, said plate having a slot therein in which said pivot pin is received to permit movement of said plate upon movement of said handles toward each other whereby said material inserted between said jaws is first deformed by said core-forming projection and then made into a complete loop by means of said jaws in one continuous operation, said jaws being of different length, the end surface of said shorter jaw having a guide groove therein for retaining said material to be looped, and the longer jaw having a recess therein for holding the end of said material prior to the deformation thereof.

2. Pliers for forming a complete loop in the end of a wire or strip-like material as claimed in claim 1 wherein said shorter jaw is provided with a guide groove in its upper end surface and the longer jaw is provided with a guide groove in its side surface adjacent to the other jaw, and both said jaws having semi-circular cut-out portions in the adjacent side surfaces of each of said jaws for maintaining said wire and deforming the same to the desired shape.

References Cited in the file of this patent

UNITED STATES PATENTS

| | | |
|---|---|---|
| 429,961 | Robbins | June 10, 1890 |
| 2,485,459 | Rackowski | Oct. 18, 1949 |

FOREIGN PATENTS

| | | |
|---|---|---|
| 276,067 | Germany | July 3, 1914 |

UNITED STATES PATENT OFFICE

CERTIFICATE OF CORRECTION

Patent No. 2,824,583 February 25, 1958

Pieter Dirk Knoester

It is hereby certified that error appears in the above numbered patent requiring correction and that the said Letters Patent should read as corrected below.

In the heading to the printed specification, between lines 7 and 8, insert the following:

--Claims priority, application Netherlands June 29, 1954--

Signed and sealed this 15th day of July 1958.

(SEAL)
Attest:
KARL H. AXLINE

Attesting Officer

ROBERT C. WATSON
Commissioner of Patents